May 11, 1965  C. E. WESTENSKOW  3,183,420
POSITIONING SERVOSYSTEMS
Filed Jan. 18, 1962

*INVENTOR.*
CARL E. WESTENSKOW
BY
George E. Rowly
ATTORNEY

… …

United States Patent Office 3,183,420
Patented May 11, 1965

3,183,420
POSITIONING SERVOSYSTEMS
Carl Eugene Westenskow, San Jose, Calif., assignor to International Business Machines Corporation, New York, N.Y., a corporation of New York
Filed Jan. 18, 1962, Ser. No. 167,003
6 Claims. (Cl. 318—18)

The invention relates to servosystems and it particularly pertains to control voltage developing circuits for positioning servosystems operating on a combination of distance and velocity signals.

Servosystems are widely used, and the art is highly developed. There are known servosystems for positioning and repositioning a utilization device in discontinuous manner, as distinguished from systems for moving one device in synchronism with another. For example, U.S. Patent 2,994,856, issued August 1, 1961, to Wesley E. Dickinson, shows and describes a servosystem for positioning and repositioning an electromagnetic transducer adjacent selected portions of a magnetic recording medium from time to time in response to command signals generated in a data processing system of which the servosystem is a part. This arrangement incorporates means for generating a voltage proportional to the distance the transducer is to be moved for controlling the starting and the movement of the utilization device, and it also incorporates means for generating a voltage proportional to the velocity at which the transducer is moved for slowing the movement and stopping the transducer at the desired location. It is highly desirable to position the transducer in as short a time as possible in order to provide a minimum access time to information stored in the recording medium. Rapid acceleration is therefore important, but equally important is rapid deceleration in anticipation of the destination to enable the transducer to arrive at the destination in a minimum amount of time and to settle with a minimum amount of hunting as well.

An object of the invention is to provide an improved mechanism for positioning a utilization device in a minimum amount of time.

A more specific object of the invention is to provide an improved mechanism for positioning a magnetic transducer adjacent selected portions of a magnetic recording medium in minimum time.

Another object of the invention is to provide an electric wave shaping and combining circuit for developing a control voltage for a servosystem arranged for moving a utilization device from point to point along a predetermined path in minimum time.

In order that the invention may be fully appreciated and the advantages thereof readily obtained in practice, the principle of the invention and the best mode which has been contemplated of applying that principle, is set forth hereinafter by means of express embodiments of the invention, given by way of examples only, with reference to the accompanying drawing, forming a part of the specification, and in which.

Figure 1:
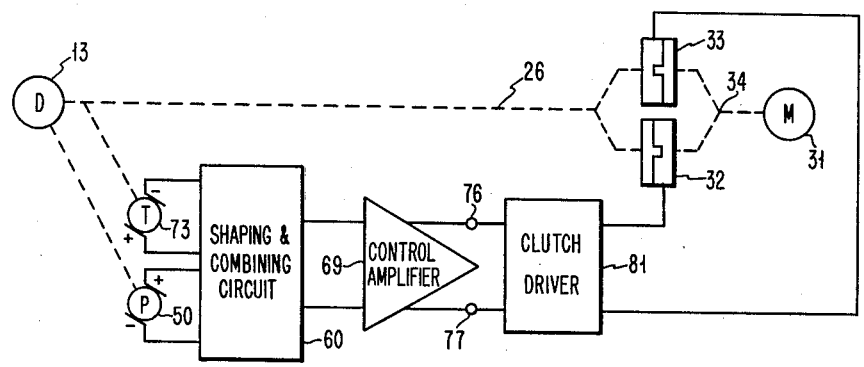
FIGURE 1 is a functional diagram of a servosystem to which the invention is applicable.

FIG. 1 outlines a servosystem particularly applicable but not limited to the positioning of a utilization device 13, such as the electromagnetic transducer 13 shown in the above mentioned U.S. Patent 2,994,856 adjacent selected portions of a magnetic disk storage file. The utilization device is positioned in response to rotating movement of a drive shaft 26 driven by an electric motor 31 in response to activation of either a right hand electromagnetic clutch 32 or a left hand clutch 33, through the intermediary of a drive member 34. For additional details of an example of such an arrangement, reference is invited to the above mentioned U.S. Patent 2,994,856. A position generator 50 is mechanically coupled to the means 13 for moving the utilization device for producing a voltage wave proportional to the distance along a predetermined path through which the utilization device 13 is moved and of polarity corresponding to the direction of movement. The distance voltage wave from the position generator 50 is applied to a shaping and combining circuit 60, having an output circuit connected to the input circuit of a control voltage amplifier 69. A tachometer generator 73 is coupled to the shaft 26 for generating a voltage wave proportional to the velocity of rotation of the drive shaft 26 and of polarity corresponding to the direction of rotation. The velocity voltage wave from the tachometer generator 73 is applied to the shaping and combining circuit 60, after which it is reflected into the input circuit of the control amplifier 69. The output of the control amplifier 69, at terminals 76 and 77, is applied to a clutch driver circuit 81 for controlling the operation of the right and left hand clutches 32 and 33.

The invention is principally concerned with translation of the distance and velocity waves within the shaping and combining circuit 60. In the prior art arrangement exemplified by U.S. Patent 2,994,856, the control voltage amplifier 69 is a differential amplifier. The position generator 50 is connected through the intermediary of voltage wave shaping circuitry between one input terminal of the control amplifier 69 and a point of fixed reference potential with the tachometer generator 73 connected in like polarity between that point of fixed reference potential and the other terminal of the control amplifier. Such a circuit arrangement works very well with high vacuum tube amplifiers. With solid state circuitry, however, the position generator and tachometer generator voltages interact, as is to be expected since transistor circuitry is not unilateral as is vacuum tube circuitry. Unilateralization of the solid state circuitry for amplifying the voltages is not practical over the desired range of long and short movements of the utilization device.

Figure 2:
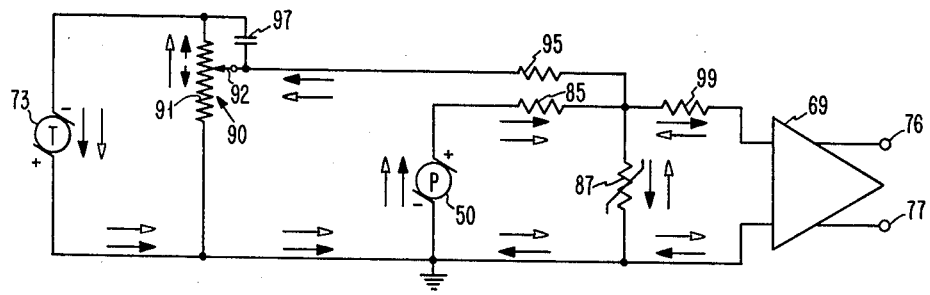
FIG. 2 is a schematic diagram of a suggested shaping and combining circuit for a servosystem of the type outlined in FIG. 1.

It has been suggested that the distance and velocity voltages be combined and shaped in opposing polarity prior to application to the same terminal of a solid state differential amplifier with the other terminal of the amplifier maintained at a point of fixed reference potential to which the distance and velocity voltages are referenced. Such a circuit arrangement is shown in FIG. 2. Here the position generator 50 is coupled through a current limiting resistor 85 across a nonlinear resistance element 87 made for example of a silicon-carbide ceramic material having a nonlinear resistance characteristic such as that best known by the registered trademark Thyrite. A tachometer generator 73 is connected to a voltage dividing potentiometer 90 having a resistive element 91 and an arm 92 connected by means of a series current limiting resistance element 95 to the nonlinear resistance element 87. A capacitor 97 is shunted across a portion of the resistive element 91 to form a resistance-capacitance circuit for differentiating a portion of the velocity voltage thereby deriving an acceleration voltage component for introduction into the control voltage wave developed. Thus, the voltage and current components applied to the nonlinear resistive element 87 are three dimensional and interrelated. The velocity voltage is proportional to the first derivative of the distance voltage and the acceleration component is proportional to the second derivative. The resultant control voltage developed across the nonlinear resistive element 87 is applied by means of a series limiting resistor 99 to the input of a differential amplifier 69 for developing a control voltage at the output terminal 76 and 77. Current flow in the components of the shaping and combining circuit 60 from the position generator 50 is shown by the arrows having solid heads and the currents from the tachometer generator 73 are shown by the arrows having hollow heads.

Figure 3:
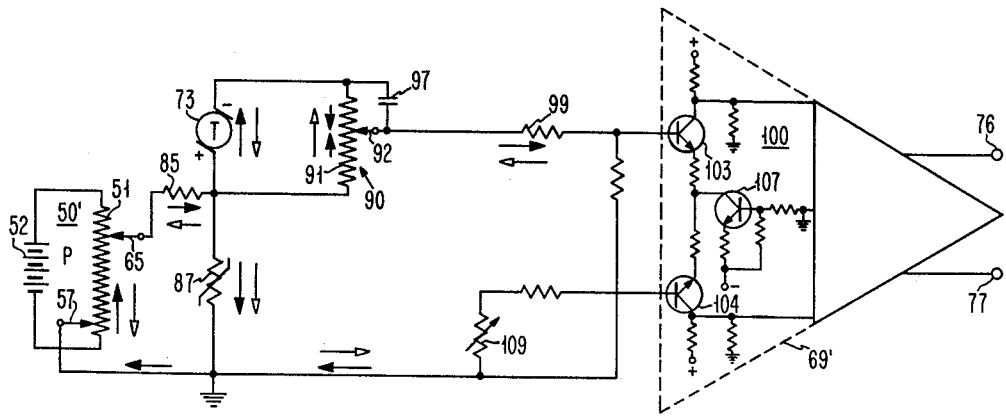
FIG. 3 is a schematic diagram of a shaping and combining circuit according to the invention, useful in a servosystem as outlined in FIG. 1.

According to the invention, less hunting, decreased access time and other improved results are obtained with the circuit arrangement of FIG. 3, which is a schematic diagram in greater detail of a circuit arrangement used for positioning an electromagnetic transducer adjacent a magnetic recording medium. The position generator 50' comprises a resistive device 51 across which a potential supply 52 is connected to produce a voltage drop across the resistive device 51. An arm 65, in contact with the resistive device 51, is coupled to the electromagnetic transducer or other utilization device 13 to be positioned in accordance with movement of the mechanism of the servosystem. Another arm 57, contacting the resistive device 51, is set at a point on the resistive device 51 indicative of the position to which the utilization device 13 is to be moved. In practice this arm is effectively set by means of known computer circuitry, such, for example, as described in the above mentioned U.S. Patent 2,994,856, but not limited thereto. The input stage 100 of the control voltage amplifier 69' is shown in detail. A pair of transistors 103 and 104 are connected in a conventional differential amplifier circuit with a common mode suppression circuit comprising a third transistor 107. A balancing potentiometer 109 having one terminal connected to a point of fixed reference potential, preferably ground as shown, is connected to one transistor 104.

According to the invention, the velocity voltage output from the tachometer 73 is referenced to the distance voltage output from the position generator 50' instead of to fixed reference potential by connecting the generators in series as shown. It should be noted that the instantaneous currents from both the tachometer generator and the position generator flow through the nonlinear resistance of element 87 in the same direction, thus maximum current flows in the shaping of the control voltage avoiding the frequent "starvation" had with the previous arrangement. Since the currents are in the same direction, there is a more positive voltage contribution at the summing junction which necessitates more opposition from the tachometer generator to switch the proper time, and upon so adjusting the tachometer potentiometer arm 92 there will be a larger damping of the movement in the linear braking region of the operating characteristic than is obtained with the prior arrangement. Furthermore, it should be noted that the instantaneous currents from the two generators oppose each other internally of the generators as they should in order that the generated voltages be more indicative of source function. It should also be noted that the current flowing through the arm 92 from the position generator is the sum of the currents flowing in the two portions of the resistive element 91 rather than the difference where the distance current through the tachometer generator was lost as in the previous arrangement. Thus, the circuit arrangement according to the invention is much more efficacious than the prior arrangements.

In the prior arrangements the directions of the instantaneous currents were such that discontinuities would appear in the curves representing current flow corresponding to abrupt changes in current, but with the arrangement shown in FIG. 3, smooth, continuous current flow results in rapid and smooth movement of the utilization device.

With the arrangement shown in FIG. 3, the maximum access time of positioning a transducer by an existing mechanism was reduced from 840 milliseconds to 760 milliseconds with no changes other than those hereinbefore discussed. The following values of components were used:

| Ref. No. | Item | Value |
| --- | --- | --- |
| 51 | Resistive strip | 25,000 ohms. |
| 52 | Potential supply | 150 volts D.C. |
| 73 | Generator | 0-25 v. D.C. |
| 85 | Resistor | 39 Kilohms. |
| 87 | Thyrite shaper and resistance | 24 Kilohms series |
| 91 | Resistive element | 250 Kilohms. |
| 97 | Capacitor | 0.22 Microfarad. |
| 99 | Resistor | 51 Kilohms. |

While a direct current servosystem is shown in the examples discussed, it should be clearly understood that the principles of the invention are equally applicable to an alternating current servosystem or any other servosystem which deals with voltages which are functions of position and velocity for the controlling action, and it should also be understood that other changes in form and detail will be made by those skilled in the art without departing from the spirit and scope of the invention.

The invention claimed is:

1. In a servosystem for positioning a utilization device of the type comprising means for moving said device along a predetermined path, means coupled to said device moving means for generating a voltage proportional to the distance said device is to be moved in positioning the same, means coupled to said device moving means for generating a voltage proportional to the velocity at which said device is moved in positioning the same, and electric circuit means coupled to said device moving means for controlling the same;

a control voltage developing circuit arrangement comprising electric circuit means for shaping voltages, means connecting said distance voltage generating means across said shaping circuit means for passing electric current therethrough in a given direction, and means connecting said velocity voltage generating means and said electric circuit means in series across said controlling circuit means for passing electric current through said shaping circuit means in said given direction.

2. A control voltage developing circuit arrangement as defined in claim 1, and wherein said shaping electric circuit means is nonlinear.

3. A control voltage developing circuit arrangement as defined in claim 1, and wherein said shaping electric circuit means is a nonlinear resistance element.

4. In a servosystem for positioning a utilization device along a predetermined path of the type comprising means for moving said device along said path, means coupled to said device moving means for generating a voltage proportional to the distance through which said device is to be moved in positioning the same, and means coupled to said device moving means for generating a voltage proportional to the velocity at which said device is moved in positioning the same;

electric circuit means for controlling said device moving means, having an input circuit, and comprising nonlinear electric circuit means for shaping voltages, electric circuit means for differentiating voltages, means coupling said shaping and said differentiating means in series across the input circuit of said controlling means, and means connecting said generating means in series and across said series coupled shaping and differentiating means for passing current through said shaping means in the same direction.

5. In a servosystem for positioning a utilization device of the type comprising
   means for moving said device along a predetermined path,
   means for generating a voltage wave proportional to the distance through which said device is to be moved,
   means for generating a voltage wave proportional to the velocity at which said device is moved, and
   means for generating a voltage wave component proportional to the acceleration through which said device is moved;
   a control voltage developing circuit arrangement comprising
   means coupling said generating means in series circuit voltage and current opposing relationship,
   a control voltage amplifying circuit having an output circuit coupled to said device moving means and an input circuit, and
   a nonlinear electric circuit element connected between said series connected generating means and said input circuit for shaping the output wave components of said generating means applied to said control voltage amplifying circuit with current flow from said generating means in the same direction through said nonlinear electric circuit element.

6. In a servosystem of the type comprising
   means for moving a utilization device along a predetermined path,
   a resistive device arranged along said path,
   means to apply a potential across said resistive device to produce a potential drop thereacross,
   means coupled to said utilization device and contacting said resistive device at a point therealong indicative of the instantaneous position of said utilization device,
   further means controlled by the apparatus of which said utilization device is a part and contacting said resistive device at a point therealong indicative of the desired relocation of said utilization device and the distance through which movement of said utilization device is desired, and
   a generator coupled to said device moving means for generating a voltage wave proportional to the velocity of movement of said utilization device between said points;
   a circuit arrangement for developing a control voltage wave comprising
   a nonlinear electric circuit element for shaping voltage waves,
   a control amplifier having an output circuit coupled to said device moving means and an input circuit, and
   means coupling said distance indicating circuitry, said velocity generator and said nonlinear electric circuit element to said input circuit of said control amplifier with instantaneous currents flowing in the same sense in said nonlinear electric circuit element.

References Cited by the Examiner
UNITED STATES PATENTS 2,871,727 2/59 Malick _____ 74—813
2,994,856 8/61 Dickinson _____ 318—29 X

OTHER REFERENCES

Servomechanism Practice, by Ahrendt and Savant, second addition, 1960 McGraw-Hill Book Company, Inc., FIGURES 8-6, page 320.

JOHN F. COUCH, *Primary Examiner.*
THOMAS J. HICKEY, *Examiner.*